United States Patent [19]
Paul

[11] Patent Number: 4,790,489
[45] Date of Patent: Dec. 13, 1988

[54] BALE SHREDDER

[75] Inventor: Nicholas J. Paul, Nr. Trowbridge, England

[73] Assignee: Kidd Farm Machinery Limited, Wiltshire, England

[21] Appl. No.: 40,596

[22] Filed: Apr. 20, 1987

[30] Foreign Application Priority Data

May 3, 1986 [GB] United Kingdom ............... 8610883

[51] Int. Cl.$^4$ ............................................. B02C 19/12
[52] U.S. Cl. ............................. 241/101 A; 241/101.7; 241/186.4; 241/224
[58] Field of Search ............ 241/101 A, 189 R, 186.4, 241/188 R, 186 R, 186.2, 186.3, 101.7, 224

[56] References Cited

U.S. PATENT DOCUMENTS

| | | | |
|---|---|---|---|
| 2,650,745 | 9/1953 | Oberwortman | 241/224 X |
| 3,615,059 | 10/1971 | Moeller | 241/186.4 X |
| 4,003,502 | 1/1977 | Barcell | 241/224 X |
| 4,448,361 | 5/1984 | Marcy | 241/186.4 X |

FOREIGN PATENT DOCUMENTS

| | | | |
|---|---|---|---|
| 747452 | 7/1980 | U.S.S.R. | 241/186.4 |
| 2122480 | 1/1984 | United Kingdom | 241/101 A X |

*Primary Examiner*—Mark Rosenbaum
*Attorney, Agent, or Firm*—Trexler, Bushnell, Giangiorgi & Blackstone, Ltd.

[57] ABSTRACT

A bale shredding device including a stationary platform above which is positioned a rotatable bale-receiving tube. An aperture in the platform exposes a rotor rotatable about an axis parallel to, and spaced from, the axis of rotation of the tub, and, the diameter of the rotor is substantially less than the diameter of the tub. Blades carried by the rotor co-act with a bale received by the tub to shred the material of the bale.

10 Claims, 1 Drawing Sheet

BALE SHREDDER

TECHNICAL FIELD

This invention relates to a device which is intended for use in shredding bales of material, such as, for example, straw, hay or silage. These bales are commonly formed and stored in a compressed condition and before the material in them can be used (e.g. for animal bedding or animal fodder) it is necessary to break them down into a looser and/or more finely divided condition in which the material can be distributed as may be desired.

BACKGROUND ART

Devices are therefore used to chop such bales in order to reduce the material in them into the desired form and in one known kind of such a device use is made of a rotor which is provided with a plurality of blades or teeth which co-act (on rotation of said rotor) with a plurality of stationary blades to shred and chop the bale material which is engaged by said blades.

Such devices may be required to deal with relatively small bales which are formed to a rectangular configuration in cross-section or with relatively large bales which are commonly formed to a circular configuration in cross-section. However devices which are intended to chop the smaller bales obviously suffer from having a restricted capacity whereas known devices intended for dealing with the larger bales usually have a relatively high power consumption. The object of the present invention is to provide an improved bale shredding device which is capable of chopping and shredding in an economical manner both the smaller and larger bales.

DISCLOSURE OF INVENTION

In accordance with the invention there is provided a bale shredding device comprising a stationary platform, a bale container in the form of a tub disposed above said platform and having an open lower end, a rotor disposed in alignment with an opening formed in said platform so as to be offset from the axis thereof, said rotor having a diameter which is substantially smaller than the internal diameter of the tub, one or more blades mounted on the rotor and projecting into the tub and bale support means disposed above said rotor, the tub and the rotor being rotatable in use by power-operated means about substantially parallel and spaced axes, the arrangement being such that, in use, a bale placed in said tub is rotated thereby whilst said blade or blades remove material from the lower end of the bale.

There may also be provided one or more further blades which are mounted around the periphery of the rotor and which act to further shred material removed by the first-mentioned blade or blades.

Preferably the tub (which may for example have an internal diameter at least twice as large as the diameter of the rotor) is in use rotated in the same direction as the rotor and both the tub and the rotor may be driven from the power take-off mechanism of an agricultural tractor or by any other convenient means. In either case, the tub may be rotated by mean of an endless belt which engages its exterior, although of course other means may be employed instead.

The interior of the tub may be provided with adjustable or inter-changeable vanes which are adapted to grip a bale as it is pushed into the tub from the upper end thereof.

The platform may be provided with stationary blades which co-act with the further blade or blades where these are provided. A plurality of fixed wedge elements may also be connected to the platform, such wedge elements acting to inhibit rotation of the removed material with the rotor. Preferably both stationary blades and wedge elements are incorporated.

The bale support means is preferably in the form of a disc which is coaxial with the rotor and which is disposed above it, the height of said disc above the rotor being adjustable.

Preferably the height to which said first-mentioned blade or blades project above the rotor is adjustable, although the or each such blade may be spring-loaded instead if desired.

BRIEF DESCRIPTION OF DRAWINGS

The invention will now be more particularly described with reference to the accompanying drawings wherein.

MODE FOR CARRYING OUT THE INVENTION

Figure 1:
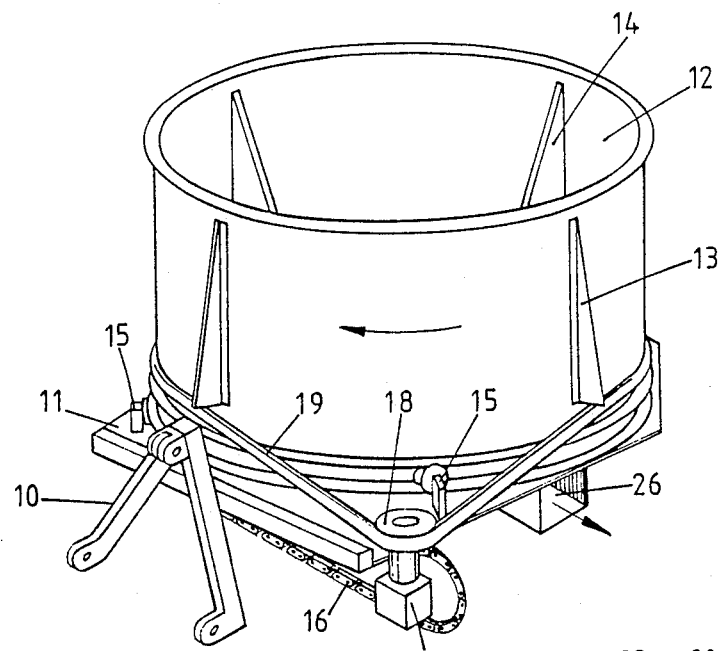
FIG. 1 is a perspective view of one example of a bale shredding device in accordance with the invention

Referring now to the drawings there is shown in FIG. 1 a bale shredding device which incorporates a frame 10 for use in connecting the device to a conventional three point linkage of an agricultural tractor whereby the device may be carried by the tractor into any required position.

The device includes a stationary housing or platform 11 on which is mounted a generally cylindrical tub 12 which is open at both its upper and lower ends. The exterior of said tub is provided with a number of strengthening ribs 13 whereas its interior is provided with a plurality of spaced vanes 14 which, as shown, are of generally wedge-shaped configuration, the narrower ends being disposed adjacent to the upper end of said tub. Said vanes are adapted in use to grip a bale of straw or hay or other material which is inserted into the tub from the upper end thereof and the vanes can either be adjustable in position (as for example by means of fixing screws which extend through elongated slots) or inter-changeable in order to accommodate different sizes and/or shapes of bale.

The tub 12 is mounted for rotation about a vertical axis on said stationary platform 11 and to this end there is mounted on the platform a plurality of roller assemblies such as are indicated by reference numeral 15. An endless chain 16 which is itself driven from the power take-off mechanism of the tractor (or from any other suitable means) serves to drive a gearbox 17 which has a driving pulley 18 which engages an endless belt 19 which in turn envelops the exterior of the tub 12 in order that it can be rotated about the aforesaid vertical axis.

Figure 4:
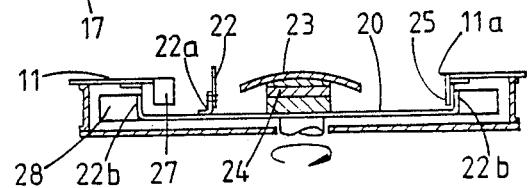
FIG. 4 is an enlarged schematic fragmentary section of the device.
Figure 2:
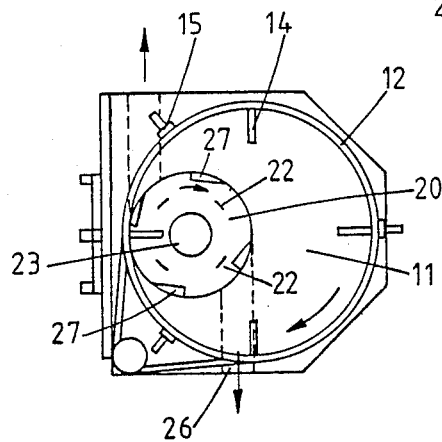
FIGS. 2 and 3 are respectively schematic plan and side elevation views of the device seen in FIG. 1
Figure 3:
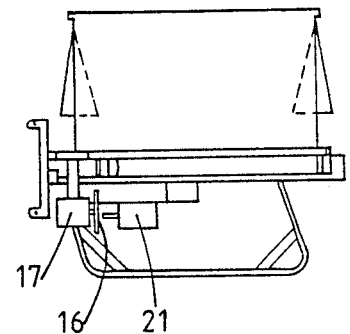

Referring now to FIGS. 2 and 4 the device also includes a rotor 20 which is aligned with but positioned somewhat below a circular aperture 11a formed in said stationary platform 11 so as to be off set from the axis thereof and said rotor is also adapted to be driven by the aforesaid power take-off mechanism of the tractor via a rotor gearbox 21 (see FIG. 3). The rotor is thus arranged to rotate about a vertical axis which is parallel to but spaced from the axis of rotation of the tub 12 and the rotor and the tub are arranged to rotate in the same direction of rotation.

Furthermore the upper surface of said rotor 20 is provided with one or more blades 22 which at their upper ends project through the aforesaid aperture formed in the platform 11 and into the space which is enclosed by the lower end of said tub 12. The blades 22 are mounted on the rotor 20 such that the height to which they project can be adjusted. The or each blade 22 may, for example, be mounted on a multi-apertured bracket 22a so that height adjustment can be obtained by selection of the particular aperture in the bracket used. Alternatively, the or each blade 22 may be spring loaded instead of being fixed to a bracket.

The rotor is also provided with bale support means in the form of a centrally arranged disc 23 which is mounted on the rotor so as to project upwardly therefrom and which is of upwardly convex form, said disc being adjustable in a vertical direction by any convenient means (not shown) so that it forms an adjustable bale support means which will determine, according to its vertical setting relative to the rotor, how far the upper ends or tips of the or each blade 22 will penetrate into the lower end of a bale which is positioned within the tub 12. Conveniently said means for adjusting the height of said disc 23 is disposed on the exterior of the device. Alternatively, as shown, a spacer 24 mounted between the disc 23 and the rotor 20 may be removed and another spacer of different thickness substituted.

A plurality of downwardly projecting stationary blades 25 are mounted on the underside of the platform around the aperture 11a. These blades 25 coact with, as shown, upwardly directed further blades 22b arranged around the periphery of the rotor 20. The blades 25 and 22b coact to further shred material removed from the lower end of a bale in the tub by blades 22 and thrown outwardly by the rotor. Instead of the stationary blades 25, or in addition thereto, there may be a plurality of wedge elements 27 on the platform within the aperture 11a. These wedge elements contact material cut from the lower end of the bale and slow down the rotation of the mass of material on the rotor, so that such material arrives at the blades 22a travelling at a lower tangential velocity than the blades, thereby allowing these blades to effect their chopping or shredding action. As will be seen from FIG. 2 the internal diameter of the tub is substantially greater than the diameter of said rotor 20 and in one convenient example said tub diameter is in fact twice that of the rotor diameter. In an alternative arrangement (not shown) the further blades 25 are not used.

There is also provided beneath said platform 11 a chute 26 having an inlet which communicates with an annulus surrounding said rotor, and an outlet which is conveniently disposed beneath the tub 12 at one side of the device. Vanes 28 on the rotor are disposed in this annulus and create a draught such that, in use material which has been shredded and cut from the bottom end of a bale placed in the tub 12 will be discharged in relatively small or fine pieces sideways in a generally horizontal direction from the device.

The rotation of the tub 12 as above described will impart a corresponding rotation to the bale contained within the tub and the rotation of the rotor in the same direction will provide in effect a kind of "servo" assistance which will generally reduce the power input required by the device. The rotation of the bale will of course also serve to move the bottom end of the bale round and across the rotating rotor in order that material can be chopped from the lower end of the bale by the rotor blade or blades. A part of the lower end surface of the bale will of course be supported by that portion of the upper surface of the platform 11 adjacent to the aperture therein and this supporting surface may either be of continuous plain form or may be provided with a series of wheels or rollers or the like which can either be freely rotatable or alternatively driven in order to assist in the rotation of the bale.

INDUSTRIAL APPLICABILITY

A bale shredding device formed in accordance with the present invention can be used to chop and shred bales of compressed material such as straw, hay or silage and the device is capable of dealing efficiently with bales of various sizes and shapes.

I claim:

1. A bale shredding device comprising a stationary platform, a bale container in the form of a tub rotatable about a predetermined axis and disposed above and rotatable relative to said platform, said tub having an open lower end, said platform having an opening formed therein so as to be offset from said axis of the tub, a rotor disposed in alignment with the opening formed in said platform and having an axis of rotation parallel to and similarly offset from the axis of rotation of the tub, said rotor having a diameter which is substantially smaller than the internal diameter of the tub, one or more blades mounted on the rotor and projecting into the tub for engaging and shredding a bale disposed within the tub, and bale support means disposed above said rotor for controlling the amount of engagement of the blades with a bale, the tub and the rotor being rotatable in use by power-operated means about said substantially parallel and spaced axes, the arrangement being such that, in use, a bale placed in said tub is rotated thereby whilst said blade or blades remove material from the lower end of the bale.

2. A bale shredding device as claimed in claim 1 wherein the tub in use is rotated in the same direction as the rotor.

3. A bale shredding device as claimed in claim 1 or claim 2 wherein the tub has an internal diameter which is at least twice as large as the diameter of the rotor.

4. A bale shredding device as claimed in claim 1 wherein the tub is rotated by means of an endless belt which engages its exterior.

5. A bale shredding device as claimed in claim 1 wherein the interior of the tub is provided with adjustable or inter-changeable vanes which are adapted to grip a bale as it is pushed into the tub from the upper end thereof.

6. A bale shredding device as claimed in claim 1 wherein there are provided one or more further blades which are mounted around the periphery of the rotor and which act to further shred material removed by said first mentioned blade or blades.

7. A bale shredding device as claimed in claim 6 wherein there are provided one or more stationary blades which are mounted on said platform and which are arranged in use to co-act with said second blade or blades.

8. A bale shredding device as claimed in claim 1 wherein a plurality of fixed wedge elements are connected to the platform so as to inhibit rotation of the material removed by said first-mentioned blade or blades.

9. A bale shredding device as claimed in claim 1 wherein said bale support means comprises a disc which is coaxial with the rotor and which is disposed above it, means being provided for adjusting the height of said disc above the rotor.

10. A bale shredding device as claimed in claim 1 wherein means are provided for adjusting the height to which said first mentioned blade or blades project above the rotor.

* * * * *